United States Patent Office 3,037,704
Patented June 5, 1962

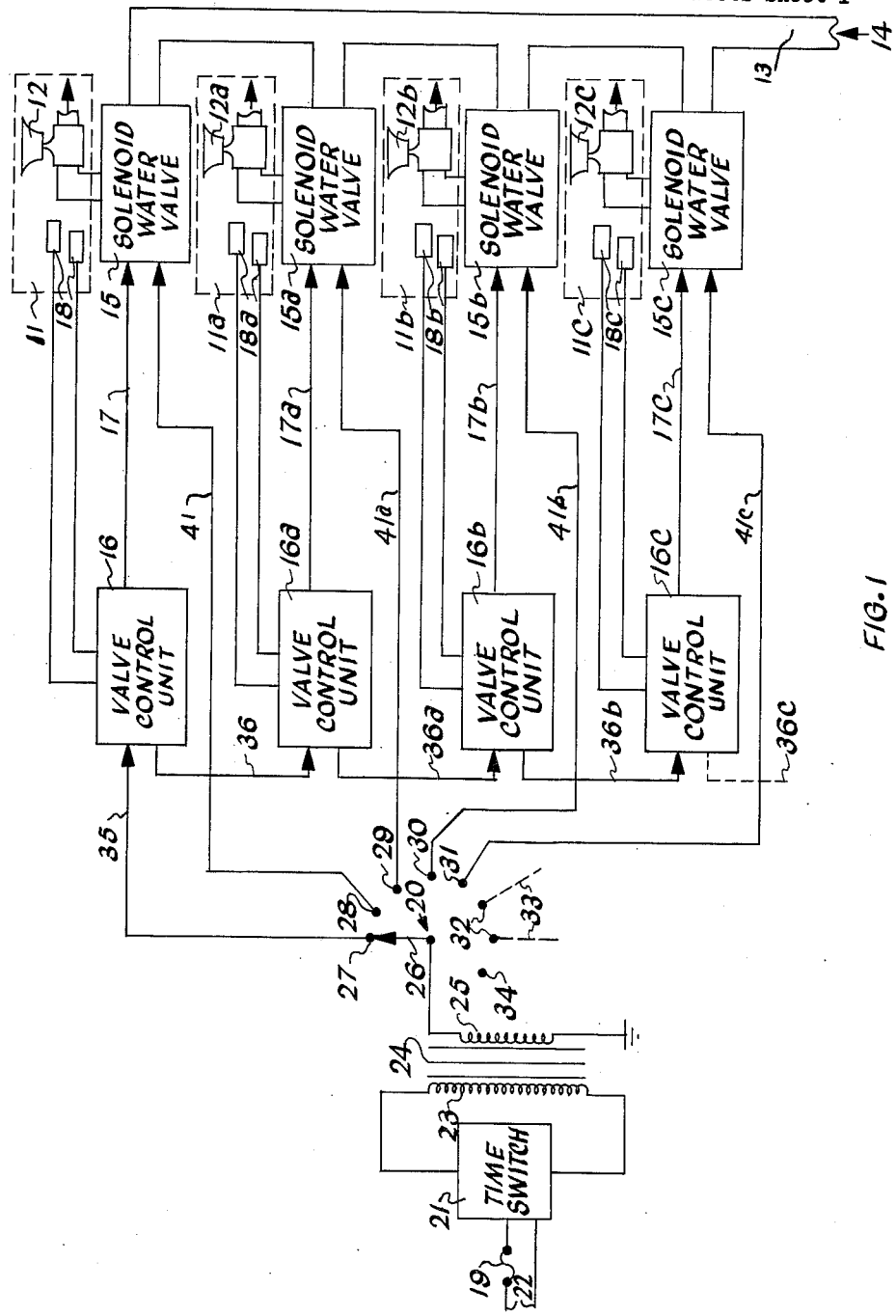

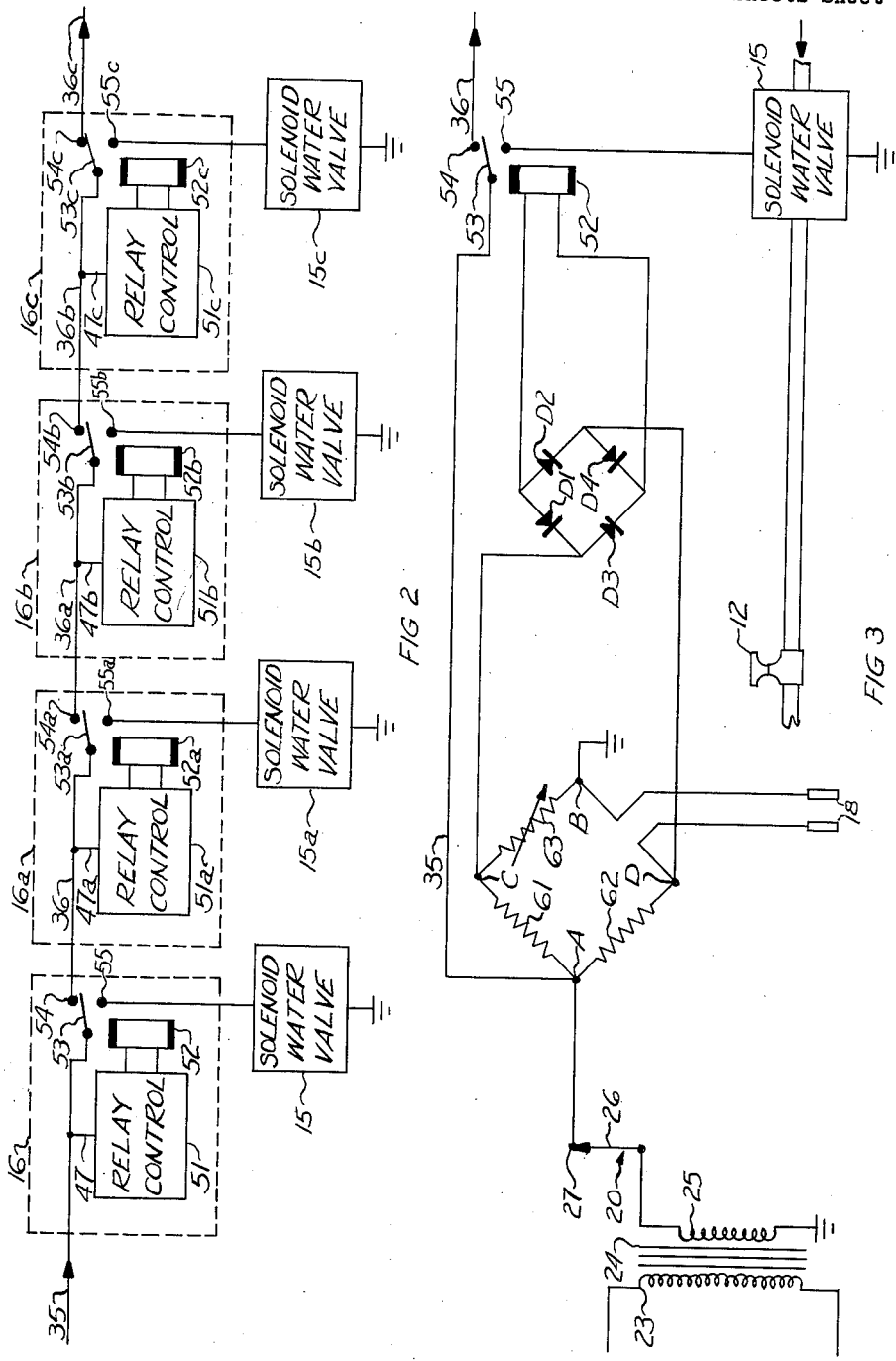

3,037,704
AUTOMATIC CONTROL FOR IRRIGATION SYSTEMS
David Kinigsberg, 1055 S. Shenandoah St., and Irving Hirsch, 6154 W. 75th Place, both of Los Angeles, Calif.
Filed Sept. 13, 1960, Ser. No. 55,669
8 Claims. (Cl. 239—63)

This invention relates to irrigation systems and more particularly to an electrically controlled irrigating system for individually sensing the moisture content of a plurality of preselected areas and individually controlling the application of moisture to said areas.

It is well known in the prior art that certain areas of land containing vegetation require periodic watering and various prior art systems have been produced for accomplishing such periodic watering. While these systems have proven adequate for some purposes they have for the most part been relatively complex, somewhat bulky and have been designed to control an entire area which requires watering at a single time. In this manner various sectors of an entire area have water applied to them in an equal manner irrespective of the individual requirements of each sector. Various sectors of land within a given larger area in most instances require more or less water depending upon the various circumstances such as for example, the amount of sun or shade which falls upon that particular sector, the chemical composition of the soil from sector to sector or from point to point within a sector, and the various types of vegetation growing within a given area such as trees, lawn, shrubs, flowers, and the like. Prior art systems have not been capable of separately and individually determining the moisture content and controlling the moisture application for each sector of a given larger area.

Accordingly, it is an object of the present invention to provide a system for irrigating preselected sectors of a given larger area of soil for a predetermined period of time for each sector, the time being determined by the soil conditions, sector locations and the like.

It is another object of the present invention to provide an irrigation system which is capable of individually and automatically controlling the application of moisture to a multiplicity of sectors within a given larger area of soil.

It is another object of the present invention to provide a system for individually and separately sensing the moisture content of a plurality of sectors within a given larger area of soil.

It is another object of the present invention to provide an irrigating system containing a self-contained control and sensitivity unit for applying moisture in a predetermined manner individually to a plurality of preselected sectors within a given larger area of soil.

Other and more specific advantages and objects of the present invention will become apparent from a consideration of the following description taken in conjunction with the accompanying drawings which are presented by way of example only and which are not intended as a limitation upon the scope of the present invention as defined in the appended claims, and in which:

FIG. 1 is a schematic diagram in block form of an irrigation system in accordance with the present invention;

FIG. 2 is a schematic diagram partly in block form of a portion of the system as illustrated in FIG. 1; and FIG. 3 is a schematic diagram of a sensitivity and control circuit in accordance with the present invention.

In accordance with one aspect of the present invention, there is provided an irrigating system including a plurality of sensing and control units each of which is associated with a preselected sector of soil within a given larger area thereof. Each of the units includes a means for sensing the moisture content within the preselected area to which there is interconnected a means for developing an electrical signal which is representative of the moisture content of the preselected area. The thus developed electrical signal is applied to a control means which is interconnected with a means for supplying water to the preselected sector in response to the actuation of the control means.

In accordance with a more specific aspect of the present invention each of the sensing and control units within an irrigation system includes a pair of probes which are embedded within the soil of a preselected sector of a given larger area. The pair of probes constitutes one arm of a resistance bridge to which there is applied an alternating current voltage. A signal which is proportional to the moisture content of the soil is developed across the resistance bridge and is applied to a rectifier. The output signal from the rectifier is applied to a relay which becomes energized only when the signal developed across the bridge in response to the moisture content of the preselected sector of soil is above a predetermined magnitude. Means is provided for presenting the predetermined magnitude in accordance with the particular conditions surrounding the preselected sector of soil. Energization of the relay in turn causes a command signal to be applied to a means for supplying water to the preselected area in accordance with the moisture content thereof and in response to the signal developed across the resistance bridge.

Although the system of the present invention is capable of being utilized in any particular situation wherein it is desired to irrigate a given area of soil, the following description will be made with particular reference, for purposes of example only, to a lawn sprinkler system. Such a system is schematically represented in FIG. 1 to which reference is hereby made. As is therein illustrated, a larger area of soil is divided into individual sectors 11, 11a, 11b, and 11c. In each instance during the following description where the system includes a plurality of like parts, only those parts relating to a particular sector will be described, however, the like parts for the remaining sectors will be so designated on the drawing by using the same number followed by a letter subscript as is above illustrated. Although only four separate and individual sectors within a larger area have been illustrated in FIG. 1, it should be expressly understood that any number of sectors may be utilized in accordance with the design considerations of the particular application in which the invention is to be used.

There is illustrated within the sector 11 means for applying moisture thereto such as, for example, a sprinkler head 12. A main water supply line 13 is interconnected to the sprinkler head 12 and has disposed therein a valve such as the solenoid water valve 15. Water flows through the main supply line 13 in the direction indicated by the arrow 14. Although only one sprinkler head is illustrated within sector 11 it should be expressly understood that any number of sprinkler heads may be connected in series or parallel as may be required in order to adequately supply moisture in a controlled manner in accordance with the present invention to sector 11. This is indicated by the extension of the water pipe from the connector for the sprinkler head 12 and the arrow adjacent thereto. A signal for actuating the solenoid valve 15 is developed by valve control unit 16 and applied by way of lead 17 to the valve 15. The signal developed by the valve control unit 16 is proportional to the moisture content of the sector 11. The moisture content is measured electrically by means of a pair of probes 18 which are embedded within the soil within sector 11.

The moisture content of the soil within sector 11 is measured by determining the electrical resistivity of the soil between the probes 18. The probes, therefore, may be constructed of any desired material which is capable of being embedded within the soil and upon application of electrical energy thereto will measure the resistivity of the soil therebetween. Such materials may be for example, carbon, brass, and the like. The probes 18 may be embedded within the soil to any desired depth depending upon the adjacent vegetation which is to be watered, for example, if a lawn is to be watered the probes are inserted within the soil to a depth of approximately two inches. On the other hand, if a tree or the like having deep roots is to be watered the probes 18 are embedded to a depth of approximately six inches.

Electrical energy is applied to the irrigation system in accordance with the present invention, only during a predetermined period. For example, electrical energy may be applied to the system during a three hour interval within a 24 hour period. This is accomplished by a time switch 21 which may be any timing device known to the art. Electrical energy is applied by way of leads 22 to time switch 21. The electrical energy is preferably alternating current of approximately 115 volts having a frequency of 60 cycles per second. At the beginning of the predetermined time period as above described time switch 21 closes applying the electrical energy from leads 22 through the fuse 19 to the primary winding 23 of transformer 24 which through normal transformer action causes the electrical energy to appear across the secondary winding 25 of the transformer 24. Transformer 24 is utilized primarily to isolate the control circuit of the irrigation system from the main power source and to reduce the voltage to a level which permits control of the system but at the same time does not endanger individuals who may be within the various sectors which are to be irrigated. One terminal of the secondary winding 25 is connected to a point of fixed potential such as, for example, ground while the other terminal of the secondary winding 25 is connected to the rotary contact 26 of the switch 20. As is illustrated, switch 20 includes a plurality of stationary contacts which cooperate with the rotary contact 26 to apply the electrical energy from the secondary winding 25 to various portions of the system as will be more fully described hereinafter.

A lead 35 is interconnected between the stationary contact 27 of switch 20 and valve control unit 16 thereby applying the electrical energy from the secondary winding 25 to the valve control unit 16.

The previously mentioned electrical energy from the secondary winding 25 is applied by valve control unit 16 through lead 36 to valve control unit 16a, and is in turn applied by valve control unit 16a through lead 36a to valve control unit 16b, and is in turn applied by valve control unit 16b through lead 36b to valve control unit 16c and is in turn applied by the lead shown in phantom 36c to the next successive valve control unit.

During the period of automatic operation of the irrigation system in accordance with the present invention, the rotary arm 26 of the switch 20 is in contact with stationary contact 27. Assuming that the time switch 21 is closed, electrical energy is applied by way of the secondary winding 25 to each of the valve control units 16, 16a, 16b, and 16c. Each valve control unit applies the electrical energy across the pair of probes associated with the valve control unit. Thus valve control unit 16 applies the electrical energy across probes 18, valve control unit 16a applies the electrical energy across probes 18a, valve control unit 16b applies the electrical energy across probes 18b, and valve control unit 16c applies the electrical energy across probes 18c. The electrical energy which is applied across a pair of probes permits a measurement to be made of the electrical resistivity of the soil disposed between the probes. If the electrical resistivity of the soil as measured by the probes 18 is at a predetermined level, a signal is developed in response thereto by the valve control unit 16 which signal causes the electrical energy to be removed from lead 36 and to be applied through lead 17 to the solenoid water valve 15. The solenoid water valve 15 opens in response to the applied electrical energy thereby applying water to the sprinkler head 12 to in turn apply moisture to the sector 11. The water is continuously applied to the sector 11 until the electrical resistivity within the sector 11 as measured between the probes 18 reaches a second predetermined level at which time the signal causing the solenoid water valve 15 to open falls below a predetermined level thereby removing the electrical energy from lead 17 and reapplying it to lead 36, thereby causing the solenoid water valve 15 to close. When valve control unit 16 causes solenoid water valve 15 to water, the electrical energy is removed from valve control unit 16a and all subsequent valve control units. Each valve control unit operates in a similar manner thereby enabling only one solenoid water valve to operate at a time. It is, therefore, seen that during the period of time that one of the solenoid water valves is open the remaining solenoid water valves are inoperable. This, therefore, permits a relatively large number of sectors to be watered during a predetermined period of time even though water pressure may be at a minimum.

It may become desirable to apply water to a preselected sector for a very long period of time. Stationary contacts 28 through 31 are provided for this purpose. Each of the stationary contacts is individually connected by way of a lead 41 to a respective one of the solenoid water valves 15. It can, therefore, be seen that by moving contact 26 of the switch 20, for example, to the stationary contact 28, the electrical energy present at secondary winding 25 is applied directly to the solenoid water valve 15 thereby opening it and causing sector 11 to be watered. The rotary contact 26 may be left in this position for any desired period of time during which sector 11 is to be watered. Such operation, of course, requires that time switch 21 be closed due to its own operation or by manual adjustment applying electrical energy from leads 22 to the primary winding 23 of transformer 24. Such apparatus is not illustrated in FIG. 1 since it is well known to the prior art. By rotating rotary contact 26 of switch 20 to each of the contacts 28 through 31 each of the solenoid water valves 15, a, b, and c may in turn be energized thereby watering the sector to which each is respectively related.

As above pointed out, additional sectors may be watered in accordance with the present invention merely by duplicating each of the individual valve control units, valves and sprinkler heads above described. Such is illustrated by stationary contacts 32 to which leads 33 shown in phantom are connected. Stationary contact 34 is provided as a manual "off" position for the switch 20. When the rotary contact 26 is placed in contact with the stationary contact 34, no power is applied by way of secondary winding 25 of transformer 24 to the irrigation system irrespective of the condition of time switch 21.

It is, therefore, seen from the foregoing description that an irrigation system in accordance with the present invention may operate either manually or automatically, and that during the automatic operation the system operates over a predetermined time period to automatically sense the moisture content of a plurality of sectors of soil and to individually control the watering of each of the sectors.

The manner of applying the electrical energy to each of the valve control units is illustrated more clearly in FIG. 2. As is therein illustrated the electrical energy is applied to the control unit 16 by way of lead 35 which is connected to a movable arm 53 of a relay 52. The relay 52 is controlled by the relay control 51 which will be described more fully below. Electrical energy is also supplied by way of lead 47 to the relay control 51. When a signal is generated in response to the moisture content of a particular sector as above described, for example, for the sector 11 the relay control 51 applies a signal to the relay 52 causing it to become energized thereby causing the movable arm 53 to contact stationary contact 55. This in turn applies the electrical energy to the solenoid water valve 15 thereby causing it to become energized. Prior to the operation of relay 52 electrical energy is applied through the normally closed contacts 53—54 of each of the relays 52 to each of the relay controls 51, a, b, and c. If, however, the moisture content of sector 11 is such that the relay control 51 causes the relay 52 to become energized and the movable arm 53 thereof to contact the stationary contact 55, the electrical energy is removed from the succeeding relay controls.

A relay control unit in conjunction with the remaining portions of one section of an entire element of the system in accordance with the present invention is illustrated in FIG. 3. The various parts shown in FIG. 3 which are identical to those above described are identified by the same reference numerals as previously used. As shown in FIG. 3, there is provided a resistance bridge having fixed resistors 61 and 62 and an adjustable or variable resistor 63. The remaining leg of the resistance bridge is composed of the electrical resistivity of the soil as measured between probes 18. Electrical energy is supplied from the secondary winding 25 of the transformer 24 by way of the switch 20 to point A of the resistance bridge, point B being returned to ground. The signal which is developed by way of the resistance bridge and which is present between points C and D is applied to a bridge rectifier comprising diodes D1 through D4. The bridge rectifier is a full-wave rectifier which converts the alternating current signal developed across the resistance bridge to direct current. Connected across the output of the bridge rectifier is relay 52.

When the electrical energy is applied during the predetermined time as above described to the irrigation system in accordance with the present invention, the operation is as follows: If the soil within the predetermined sector, such as 11, is sufficiently moist, the electrical resistivity of the soil between the probes 18 is low and the resistance bridge is in balance. During the time that the bridge is in balance the output signal developed across points C and D thereof is lower than the voltage required to energize relay 52. If, however, the soil between the probes 18 is dry, the resistivity thereof is greater and the bridge becomes unbalanced. If the bridge is unbalanced, an alternating current signal appears across points C and D thereof which, when rectified by the bridge rectifier composed of diodes D1 through D4, is sufficient to energize the relay 52. Upon relay 52 becoming energized, the movable arm 53 contacts the stationary contact 55 thereby applying the electrical energy from the secondary winding 25 of the transformer 24 to the solenoid water valve 15 causing it to open. When solenoid water valve 15 becomes open, water passes through the supply line connected thereto and to the sprinkling head 12 thereby applying moisture to the sector 11. The solenoid water valve 15 remains open until such time as the moisture content of the soil between probes 18 becomes sufficiently moist so that the resistivity of the soil between the probes 18 decreases to a point where the resistance bridge once more becomes balanced, at which time the signal appearing across points C and D is lower than that which is required to maintain relay 52 in its energized condition. At this time the movable arm 53 once again contacts the stationary contact 54 thereby applying the voltage by way of lead 36 to the next successive valve control unit.

It should be particularly noted that the resistance bridge contains in one arm thereof a variable resistor 63. Variable resistor 63 is utilized to establish the sensitivity of each of the valve control units individually. The particular setting for each of the variable resistors contained within each of the individual valve control units is established by determining the particular conditions surrounding the sector which is controlled by the respective valve control unit therefor. It should, therefore, be seen that the particular sensitivity which is desired, that is, the resistivity of the soil for each given sector which is required in order to apply moisture thereto, is individually controlled by the variable resistor contained within the resistance bridge within each of the valve control units. When the sensitivity of a particular valve control unit is established and set by adjustment of the variable resistor, the balance of the bridge is thereafter determined solely by the electrical resistivity of the soil between the probes within the preselected sector.

Further, in accordance with the present invention, each of the valve control units is a self-contained plug-in type unit which contains the relay control, along with the relay and its associated contacts as illustrated in FIGS. 2 and 3. It should, therefore, be readily seen that a control system for a particular area may include any number of sectors each of which is individually controlled by merely providing one of the self-contained valve control units therefor.

There has thus been disclosed a system for individually determining the moisture content within a plurality of sectors of soil and for individually applying and controlling the application of moisture to each of the sectors in response to the moisture content thereof.

What is claimed is:

1. A circuit for controlling valve means associated with one of a plurality of sectors of an area of soil to irrigate only said one sector in response to a predetermined moisture level therein, said control circuit comprising: a relay for each of said sectors, each of said relays having a movable arm and first and second stationary contacts, said movable arm and said first contact of each relay being normally closed, said first contact of each of said relays being connected to the movable arm of the next successive one of said relays, said second contact of each of said relays being connected to one of said valve means, a source of potential, separate relay control means connected to each of said relays, and means for connecting said source of potential to the movable arm of the first one of said relays and to each of said relay control means, each of said relay control means having means for developing an electrical signal for energizing its associated relay in response to a predetermined moisture level within its associated sector of soil to thereby actuate said valve means and apply moisture to said associated sector.

2. A control circuit according to claim 1 in which each of said relay control means includes means for adjusting said predetermined level of moisture at which said electrical signal is developed.

3. A control circuit according to claim 1 in which said means for connecting said source of potential includes an isolation transformer.

4. A control circuit according to claim 1 in which said source of potential is alternating current and said relay control means includes a resistance bridge having the resistivity of the soil in said associated sector as one arm thereof and a variable resistor as another arm thereof, and rectifying means connected across the output of said resistance bridge for converting said electrical signal to direct current for application to said relay.

5. A circuit for controlling a plurality of valve means each of which is associated with one of a plurality of sectors of an area of soil to irrigate only one sector at a time in response to a predetermined moisture level therein which is indicated by moisture level detecting means, said control circuit comprising: a separate binary switching means connected to each of said valve means, each switching means being operable to open its associated valve means only in response to the moisture level within its associated sector being below a predetermined level; means connecting each of said switching means to the moisture level detecting means within its associated sector thereby to control the actuation of said switching means, and means serially interconnecting said switching means to permit only one sector at a time to have moisture applied thereto.

6. A control circuit in accordance with claim 5 in which said switching means is a relay having at least two stationary and one movable contacts, one of said stationary contacts being connected to said valve means, said movable contact having an electrical potential applied thereto of sufficient magnitude to actuate said valve means in response to the operation of said relay.

7. A control circuit in accordance with claim 6 in which the other of said stationary contacts and the movable contact of the next succeeding relay are connected in series and to a source of potential for actuating said valve means.

8. A circuit for controlling a plurality of solenoid valve means each of which is associated with one of a plurality of sectors of an area of soil to irrigate only one sector at a time in response to the moisture level therein being below a predetermined point as indicated by moisture level detecting means, said control circuit comprising: a resistance bridge network, one arm of which is said moisture level detecting means and one arm of which is adjustable to establish said predetermined points; a source of alternating current potential connected as the input voltage to said bridge network; rectifying means connected across the output of said bridge network to convert the alternating current output signal therefrom to a direct current signal; a relay having a coil, a movable contact, and first and second stationary contacts, said relay coil being connected to said rectifying means whereby said relay is energized when the output signal from said bridge network is above said predetermined point, said movable contact having applied thereto an electrical potential sufficient to actuate said solenoid valve, one of said stationary contacts being connected to said solenoid valve and being disconnected from said movable contact when said coil is not energized, the other of said stationary contacts being connected to the movable contact of the next succeeding relay to apply the valve actuating potential thereto whereby upon energization of said relay succeeding relays are prevented from actuating the solenoid valves associated therewith.

References Cited in the file of this patent

UNITED STATES PATENTS

| | | |
|---|---|---|
| 2,695,976 | Hasenkamp | Nov. 30, 1954 |
| 2,796,291 | Mueller | June 13, 1957 |
| 2,875,428 | Griswold | Feb. 24, 1959 |
| 2,928,406 | Cuniff et al. | Mar. 15, 1960 |
| 2,952,273 | Griswold | Sept. 13, 1960 |